United States Patent
Chae

(10) Patent No.: US 10,451,842 B2
(45) Date of Patent: Oct. 22, 2019

(54) LENS MODULE

(71) Applicant: Samsung Electro-Mechanics Co., Ltd., Suwon-si (KR)

(72) Inventor: Kyu Min Chae, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/942,346

(22) Filed: Nov. 16, 2015

(65) Prior Publication Data

US 2016/0161716 A1    Jun. 9, 2016

(30) Foreign Application Priority Data

Dec. 8, 2014  (KR) ................. 10-2014-0175022

(51) Int. Cl.
  *G02B 13/00*  (2006.01)
  *G02B 9/62*  (2006.01)

(52) U.S. Cl.
  CPC .......... *G02B 13/0045* (2013.01); *G02B 9/62* (2013.01)

(58) Field of Classification Search
  CPC ....... G02B 13/0045; G02B 9/62; G02B 13/04
  USPC ........................................ 359/713, 761, 756
  See application file for complete search history.

(56) References Cited

U.S. PATENT DOCUMENTS

| | | | |
|---|---|---|---|
| 7,453,654 B2 | 11/2008 | Shinohara | |
| 9,377,605 B2 | 6/2016 | Chung et al. | |
| 2010/0271601 A1 | 10/2010 | Amano | |
| 2011/0134305 A1 | 6/2011 | Sano et al. | |
| 2014/0118844 A1 | 5/2014 | Tsai et al. | |
| 2015/0022905 A1 | 1/2015 | Shinohara et al. | |
| 2015/0098135 A1* | 4/2015 | Chung | G02B 13/18 359/713 |
| 2015/0124332 A1* | 5/2015 | Noda | G02B 13/0045 359/713 |
| 2015/0212296 A1 | 7/2015 | Huang et al. | |
| 2016/0147044 A1* | 5/2016 | Kondo | G02B 13/0045 359/761 |

FOREIGN PATENT DOCUMENTS

| | | |
|---|---|---|
| CN | 203981955 U | 12/2014 |
| CN | 104516094 A | 4/2015 |
| JP | 2011-59640 A | 3/2011 |
| JP | 2014-44250 A | 3/2014 |
| KR | 10-2011-0042382 A | 4/2011 |

(Continued)

OTHER PUBLICATIONS

Lohmann, Adolf. "Scaling Laws for Lens Systems." Applied Optics, vol. 28, No. 23, Dec. 1, 1989.*

(Continued)

*Primary Examiner* — Zachary W Wilkes
(74) *Attorney, Agent, or Firm* — NSIP Law

(57) ABSTRACT

A lens module includes: a first lens having negative refractive power; a second lens having positive refractive power; a third lens having negative refractive power; a fourth lens having negative refractive power; a fifth lens of which an object-side surface is concave; and a sixth lens having one or more inflection points on an image-side surface thereof, wherein the first to sixth lenses are sequentially disposed from an object side of the lens module to an image side of the lens module.

19 Claims, 16 Drawing Sheets

(56) References Cited

FOREIGN PATENT DOCUMENTS

TW         201418764 A        5/2014

OTHER PUBLICATIONS

Korean Office Action dated Aug. 19, 2016, in counterpart Korean Application No. 10-2014-0175022 (7 pages in English, 6 pages in Korean).
Chinese Office Action dated Aug. 23, 2017 in corresponding Chinese Patent Application No. 201510874647.1. (8 pages in English and 6 pages in Chinese).
Chinese Office Action dated Mar. 12, 2018, in corresponding Chinese Application No. 201510874647.1 (10 pages in English, 7 pages in Chinese).

\* cited by examiner

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | Infinity | Infinity | | | |
| 1 | -2.854 | 0.282 | 1.546 | 56.1 | FIRST LENS |
| 2 | -3.113 | 0.050 | | | |
| 3 | 1.972 | 0.656 | 1.546 | 56.1 | SECOND LENS |
| 4 | -3.267 | 0.080 | | | |
| 5 | 97.560 | 0.300 | 1.638 | 23.4 | THIRD LENS |
| 6 | 2.429 | 0.288 | | | |
| 7 | 11.021 | 0.452 | 1.546 | 56.1 | FOURTH LENS |
| 8 | 10.022 | 0.299 | | | |
| 9 | -2.120 | 0.686 | 1.546 | 56.1 | FIFTH LENS |
| 10 | -0.846 | 0.080 | | | |
| 11 | 7.990 | 0.672 | 1.546 | 56.1 | SIXTH LENS |
| 12 | 0.952 | 0.370 | | | |
| 13 | Infinity | 0.300 | 1.517 | 64.2 | FILTER |
| 14 | Infinity | 0.558 | | | |
| IMAGE PLANE | Infinity | - | - | - | |

FIG. 3

| Ex.1 | CONIC (K) | 4TH ORDER (A) | 6TH ORDER (B) | 8TH ORDER (C) | 10TH ORDER (D) | 12TH ORDER (E) | 14TH ORDER (F) |
|---|---|---|---|---|---|---|---|
| 1 | 0.00000 | 0.00440 | 0.00629 | 0.00000 | 0.00000 | 0.00000 | 0.00000 |
| 2 | 0.00000 | 0.01011 | 0.01238 | 0.00000 | 0.00000 | 0.00000 | 0.00000 |
| 3 | 0.00000 | -0.02783 | -0.00718 | -0.06267 | 0.00000 | 0.00000 | 0.00000 |
| 4 | 0.00000 | -0.07582 | 0.08629 | -0.20724 | 0.11124 | 0.00000 | 0.00000 |
| 5 | 0.00000 | -0.12640 | 0.34881 | -0.65271 | 0.61908 | -0.19474 | 0.00000 |
| 6 | 0.00000 | -0.12938 | 0.32773 | -0.45310 | 0.34514 | -0.08492 | 0.00000 |
| 7 | 0.00000 | -0.17545 | 0.05435 | 0.07031 | -0.13415 | 0.09473 | 0.00000 |
| 8 | 0.00000 | -0.05106 | -0.04015 | 0.06956 | -0.06888 | 0.02416 | 0.00000 |
| 9 | -1.08797 | 0.14676 | -0.07568 | 0.02673 | -0.04153 | 0.02751 | -0.00919 |
| 10 | -3.44685 | -0.08570 | 0.13077 | -0.13926 | 0.09287 | -0.03457 | 0.00565 |
| 11 | 0.00000 | -0.05401 | -0.03229 | 0.01387 | -0.00125 | 0.00000 | 0.00000 |
| 12 | -6.51946 | -0.04948 | 0.00985 | -0.00238 | 0.00033 | -0.00002 | 0.00000 |

FIG. 4

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | Infinity | Infinity | | | |
| 1 | -1.252 | 0.274 | 1.546 | 56.1 | FIRST LENS |
| 2 | -1.547 | 0.050 | | | |
| 3 | 1.932 | 0.733 | 1.546 | 56.1 | SECOND LENS |
| 4 | -1.543 | 0.080 | | | |
| 5 | -7.155 | 0.300 | 1.638 | 23.4 | THIRD LENS |
| 6 | 2.601 | 0.313 | | | |
| 7 | -5.777 | 0.316 | 1.546 | 56.1 | FOURTH LENS |
| 8 | -6.299 | 0.190 | | | |
| 9 | -1.353 | 0.623 | 1.546 | 56.1 | FIFTH LENS |
| 10 | -0.712 | 0.080 | | | |
| 11 | 2.803 | 0.445 | 1.546 | 56.1 | SIXTH LENS |
| 12 | 0.789 | 0.370 | | | |
| 13 | Infinity | 0.300 | 1.517 | 64.2 | FILTER |
| 14 | Infinity | 0.521 | | | |
| IMAGE PLANE | Infinity | - | - | - | |

FIG. 7

| Ex.2 | CONIC (K) | 4TH ORDER (A) | 6TH ORDER (B) | 8TH ORDER (C) | 10TH ORDER (D) | 12TH ORDER (E) | 14TH ORDER (F) |
|---|---|---|---|---|---|---|---|
| 1 | 0.00000 | 0.27768 | -0.14637 | 0.18983 | -0.07428 | 0.00000 | 0.00000 |
| 2 | 0.00000 | 0.20449 | 0.00178 | -0.07886 | 0.22554 | 0.00000 | 0.00000 |
| 3 | 0.00000 | -0.11341 | 0.01474 | -0.14023 | 0.00000 | 0.00000 | 0.00000 |
| 4 | 0.00000 | 0.05084 | -0.27235 | 0.30007 | -0.18860 | 0.00000 | 0.00000 |
| 5 | 0.00000 | 0.13027 | -0.35950 | 0.29787 | -0.00468 | -0.04224 | 0.00000 |
| 6 | 0.00000 | 0.01521 | -0.04457 | -0.09991 | 0.23430 | -0.10579 | 0.00000 |
| 7 | 0.00000 | -0.18122 | -0.31876 | 1.12236 | -0.79760 | 0.18203 | 0.00000 |
| 8 | 0.00000 | 0.06713 | -0.70481 | 1.21243 | -0.77451 | 0.19379 | 0.00000 |
| 9 | -1.08797 | 0.48148 | -0.85116 | 1.35660 | -1.23734 | 0.57938 | -0.11404 |
| 10 | -3.44685 | -0.07889 | 0.05225 | 0.21195 | -0.21448 | 0.07540 | -0.00947 |
| 11 | 0.00000 | -0.16386 | 0.04427 | -0.00540 | 0.00023 | 0.00000 | 0.00000 |
| 12 | -6.51946 | -0.06276 | 0.00852 | 0.00052 | -0.00045 | 0.00004 | 0.00000 |

FIG. 8

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | Infinity | Infinity | | | |
| 1 | 8.289 | 0.287 | 1.546 | 56.1 | FIRST LENS |
| 2 | 7.611 | 0.050 | | | |
| 3 | 2.243 | 0.600 | 1.546 | 56.1 | SECOND LENS |
| 4 | -3.170 | 0.080 | | | |
| 5 | 39.642 | 0.300 | 1.638 | 23.4 | THIRD LENS |
| 6 | 2.421 | 0.239 | | | |
| 7 | 4.204 | 0.329 | 1.546 | 56.1 | FOURTH LENS |
| 8 | 5.713 | 0.272 | | | |
| 9 | -2.120 | 0.697 | 1.546 | 56.1 | FIFTH LENS |
| 10 | -0.846 | 0.080 | | | |
| 11 | 23.402 | 0.781 | 1.546 | 56.1 | SIXTH LENS |
| 12 | 1.023 | 0.370 | | | |
| 13 | Infinity | 0.300 | 1.517 | 64.2 | FILTER |
| 14 | Infinity | 0.542 | | | |
| IMAGE PLANE | Infinity | - | - | - | |

| Ex.3 | CONIC (K) | 4TH ORDER (A) | 6TH ORDER (B) | 8TH ORDER (C) | 10TH ORDER (D) | 12TH ORDER (E) | 14TH ORDER (F) |
|---|---|---|---|---|---|---|---|
| 1 | 0.00000 | -0.03383 | 0.00895 | 0.00000 | 0.00000 | 0.00000 | 0.00000 |
| 2 | 0.00000 | -0.01599 | 0.04182 | 0.00000 | 0.00000 | 0.00000 | 0.00000 |
| 3 | 0.00000 | -0.02011 | 0.00655 | -0.06690 | 0.00000 | 0.00000 | 0.00000 |
| 4 | 0.00000 | -0.08844 | 0.08850 | -0.21820 | 0.11628 | 0.00000 | 0.00000 |
| 5 | 0.00000 | -0.12850 | 0.33768 | -0.63561 | 0.59736 | -0.18482 | 0.00000 |
| 6 | 0.00000 | -0.14346 | 0.33536 | -0.45631 | 0.33101 | -0.07802 | 0.00000 |
| 7 | 0.00000 | -0.21078 | 0.03981 | 0.07834 | -0.13509 | 0.09380 | 0.00000 |
| 8 | 0.00000 | -0.07680 | -0.03964 | 0.06828 | -0.06999 | 0.02350 | 0.00000 |
| 9 | -1.08797 | 0.10551 | 0.00899 | -0.07933 | 0.03370 | 0.00173 | -0.00720 |
| 10 | -3.44685 | -0.15578 | 0.22999 | -0.26000 | 0.17445 | -0.06001 | 0.00928 |
| 11 | 0.00000 | -0.03203 | -0.05474 | 0.02279 | -0.00220 | 0.00000 | 0.00000 |
| 12 | -6.51946 | -0.04570 | 0.00935 | -0.00227 | 0.00032 | -0.00002 | 0.00000 |

| SURFACE NO. | RADIUS OF CURVATURE | THICKNESS/ DISTANCE | REFRACTIVE INDEX | ABBE NUMBER | REMARK |
|---|---|---|---|---|---|
| OBJECT | Infinity | Infinity | | | |
| 1 | 12.000 | 0.297 | 1.546 | 56.1 | FIRST LENS |
| 2 | 10.718 | 0.050 | | | |
| 3 | 2.605 | 0.523 | 1.546 | 56.1 | SECOND LENS |
| 4 | -2.196 | 0.080 | | | |
| 5 | -18.462 | 0.300 | 1.638 | 23.4 | THIRD LENS |
| 6 | 2.248 | 0.148 | | | |
| 7 | 3.506 | 0.300 | 1.546 | 56.1 | FOURTH LENS |
| 8 | 5.380 | 0.203 | | | |
| 9 | -2.120 | 0.647 | 1.546 | 56.1 | FIFTH LENS |
| 10 | -0.846 | 0.080 | | | |
| 11 | 6.195 | 0.763 | 1.546 | 56.1 | SIXTH LENS |
| 12 | 1.035 | 0.370 | | | |
| 13 | Infinity | 0.300 | 1.517 | 64.2 | FILTER |
| 14 | Infinity | 0.539 | | | |
| IMAGE PLANE | Infinity | - | - | - | |

FIG. 15

| Ex.4 | CONIC (K) | 4TH ORDER (A) | 6TH ORDER (B) | 8TH ORDER (C) | 10TH ORDER (D) | 12TH ORDER (E) | 14TH ORDER (F) |
|---|---|---|---|---|---|---|---|
| 1 | 0.00000 | -0.03341 | 0.05860 | -0.21839 | 0.35188 | 0.00000 | 0.00000 |
| 2 | 0.00000 | -0.07696 | 0.40283 | -1.14541 | 1.20667 | 0.00000 | 0.00000 |
| 3 | 0.00000 | -0.11060 | 0.19988 | -0.56489 | 0.00000 | 0.00000 | 0.00000 |
| 4 | 0.00000 | -0.04436 | 0.04754 | -0.10963 | -0.27684 | 0.00000 | 0.00000 |
| 5 | 0.00000 | -0.10016 | 0.33414 | -0.64708 | 0.57203 | -0.19783 | 0.00000 |
| 6 | 0.00000 | -0.17936 | 0.32815 | -0.46118 | 0.32250 | -0.08589 | 0.00000 |
| 7 | 0.00000 | -0.21448 | 0.07345 | 0.10701 | -0.12798 | 0.06548 | 0.00000 |
| 8 | 0.00000 | -0.06279 | -0.02839 | 0.07247 | -0.06774 | 0.03051 | 0.00000 |
| 9 | -1.08797 | 0.18067 | -0.11580 | 0.27020 | -0.40631 | 0.27749 | -0.07520 |
| 10 | -3.44685 | -0.16791 | 0.26173 | -0.31661 | 0.31473 | -0.14749 | 0.02568 |
| 11 | 0.00000 | -0.05191 | -0.05053 | 0.02329 | -0.00236 | 0.00000 | 0.00000 |
| 12 | -6.51946 | -0.03377 | 0.00101 | -0.00090 | 0.00029 | -0.00003 | 0.00000 |

FIG. 16

LENS MODULE

CROSS-REFERENCE TO RELATED APPLICATION(S)

This application claims the benefit of Korean Patent Application No. 10-2014-0175022 filed on Dec. 8, 2014 in the Korean Intellectual Property Office, the entire disclosure of which is incorporated herein by reference for all purposes.

BACKGROUND

1. Field

The following description relates to a lens module having an optical system including multiple lenses.

Description of Related Art

A conventional lens module mounted in a camera of a mobile communications terminal includes a plurality of lenses. For example, the lens module may include six lenses in order to configure an optical system having high resolution.

However, when the optical system having high resolution is configured using the plurality of lenses as described above, a length (distance from an object-side surface of a first lens to an image plane) of the optical system may be increased. In this case, it is difficult to mount the lens module in a slim mobile communications terminal. Therefore, the development of a lens module having an optical system of decreased length is desirable.

For reference, Japanese Patent Publication No. JP2014-044250 A and U.S. Patent Application Publication No. US2014-0118844 A1 disclose lenses in the related art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a lens module includes: a first lens having negative refractive power; a second lens having positive refractive power; a third lens having negative refractive power; a fourth lens having negative refractive power; a fifth lens of which an object-side surface is concave; and a sixth lens having one or more inflection points on an image-side surface thereof, wherein the first to sixth lenses are sequentially disposed from an object side of the lens module to an image side of the lens module.

The first lens may have a meniscus shape.
An object-side surface of the second lens may be convex.
An image-side surface of the second lens may be convex.
At least one of an object-side surface and an image-side surface of the third lens is concave.
The fourth lens may have a meniscus shape.
An image-side surface of the fifth lens may be convex.
An object-side surface of the sixth lens may be convex.
The image-side surface of the sixth lens may be concave.
The refractive power of the first lens may be stronger than a refractive power of the sixth lens.

According to another general aspect, a lens module comprises: a first lens having negative refractive power; a second lens having positive refractive power; a third lens of which an image-side surface is concave; a fourth lens having refractive power; a fifth lens having positive refractive power, an object-side surface thereof being concave; and a sixth lens having negative refractive power and having one or more inflection points on an image-side surface thereof, an object-side surface thereof being convex, wherein the first to sixth lenses are sequentially disposed from an object side of the lens module to an image side of lens module.

The first lens may have a meniscus shape.
An image-side surface and an object-side surface of the second lens may be convex.
An object-side surface of the third lens may be convex.
The fourth lens may have a meniscus shape.
An image-side surface of the fifth lens may be convex.
The image-side surface of the sixth lens may be concave.
The refractive power of the first lens may be stronger than the refractive power of the sixth lens.

Other features and aspects will be apparent from the following detailed description, the drawings, and the claims.

BRIEF DESCRIPTION OF DRAWINGS

FIG. 3 is a table illustrating characteristics of lenses illustrated in FIG. 1.
FIG. 4 is a table representing conic constants and aspheric coefficients of the lens module illustrated in FIG. 1.
FIG. 7 is a table illustrating characteristics of lenses illustrated in FIG. 5.
FIG. 8 is a table representing conic constants and aspheric coefficients of the lens module illustrated in FIG. 5.
FIG. 11 is a table illustrating characteristics of lenses illustrated in FIG. 9.
FIG. 12 is a table representing conic constants and aspheric coefficients of the lens module illustrated in FIG. 9.
FIG. 15 is a table representing characteristics of lenses illustrated in FIG. 13.
FIG. 16 is a table representing conic constants and aspheric coefficients of the lens module illustrated in FIG. 13.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
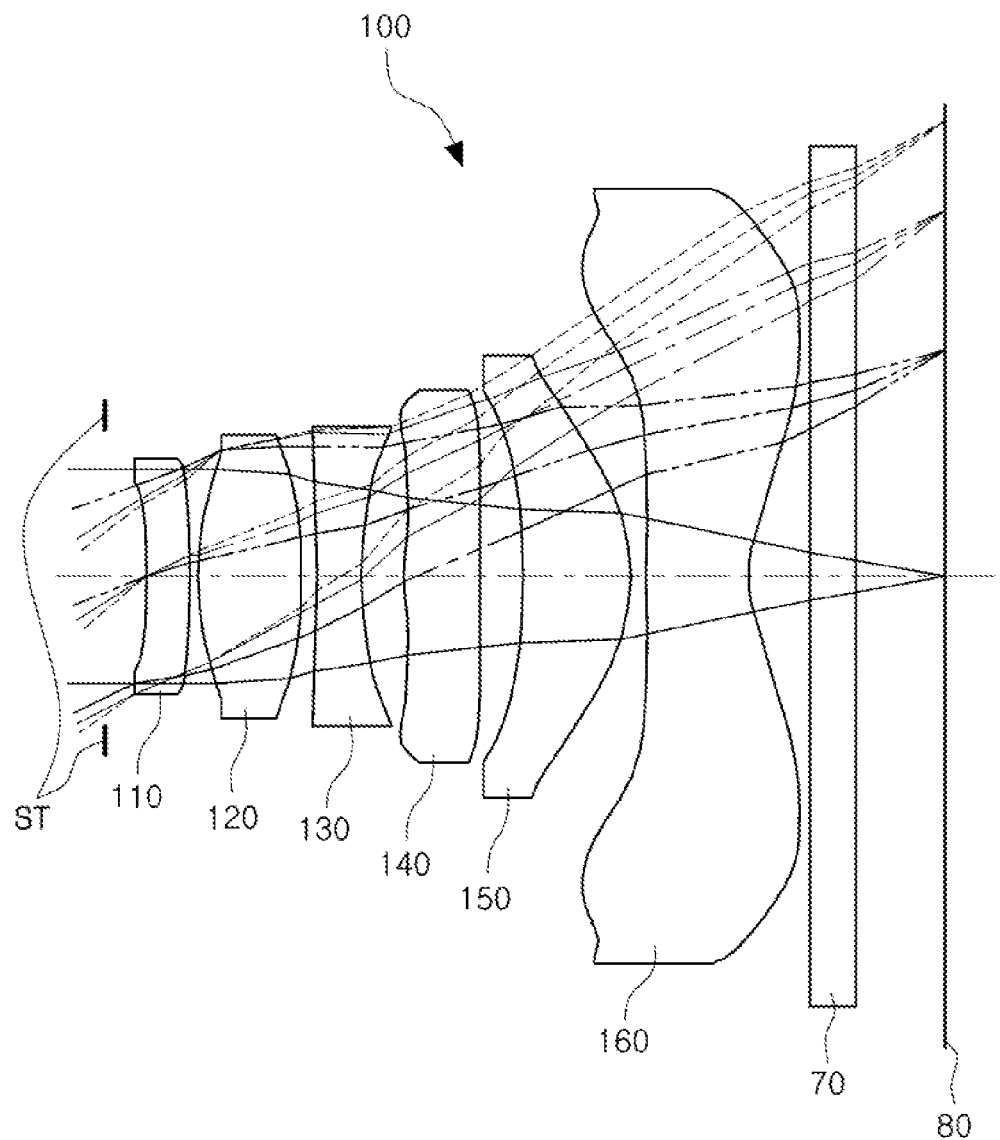
FIG. 1 is a view of a lens module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In the following description, a first lens refers to a lens closest to an object (or a subject), while a sixth lens refers to a lens closest to an image plane (or an image sensor). Further, a first surface of each lens refers to a surface of the respective lens that is closest to an object (or a subject), and a second surface of each lens refers to a surface of the respective lens that is closest to an image plane (or an image sensor). Further, in the present specification, all of radii of curvature, thicknesses, OALs (optical axis distances from a first surface of the first lens to the image plane), SLs, IMGHs (image heights), and BFLs (back focus lengths) of the lenses, an overall focal length of an optical system, and a focal length of each lens are expressed in millimeters (mm). Additionally, thicknesses of lenses, gaps between the lenses, OALs, and SLs are distances measured based on an optical axis of the lenses. Further, in a description for shapes of the lenses, a description of one surface of a lens as being convex means that an optical axis portion (e.g., central portion) of the corresponding surface is convex, and a description of one surface of a lens as being concave means that an optical axis portion (e.g. central portion) of the corresponding surface is concave. Therefore, although it is described that one surface of a lens is convex, an edge portion of the lens may be concave. Likewise, although it is described that one surface of a lens is concave, an edge portion of the lens may be convex.

A lens module includes an optical system including a plurality of lenses. As an example, the optical system of the lens module may include six lenses having refractive power. However, the lens module is not limited to only including the six lenses. For example, the lens module may include other components that do not have refractive power. As an example, the lens module may include a stop configured to control an amount of light. As another example, the lens module may further include an infrared cut-off filter configured to filter infrared light. As another example, the lens module may further include an image sensor (that is, an imaging device) configured to convert an image of a subject (object) incident thereon through the optical system into electrical signals. As another example, the lens module may further include a gap maintaining member configured to adjust a gap between lenses.

First to sixth lenses may be formed of materials having a refractive index different from that of air. For example, the first to sixth lenses may be formed of plastic or glass. At least one of the first to sixth lenses may have an aspherical surface shape. As an example, only the sixth lens of the first to sixth lenses may have the aspherical surface shape. As another example, at least one surface of all of the first to sixth lenses may be aspherical. Here, the aspherical surface of each lens may be represented by the following Equation 1:

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}.$$ [Equation 1]

In Equation 1, c is an inverse of a radius of curvature of a corresponding lens, K is a conic constant, and r is a distance from a certain point on an aspherical surface to an optical axis in a direction perpendicular to the optical axis. In addition, constants A to J sequentially refer to 4th order to 20th order aspheric coefficients. In addition, Z is a distance between the certain point on the aspherical surface at the distance r and a tangential plane meeting the apex of the aspherical surface of the lens.

The optical system configuring the lens module may have a wide field of view (FOV) of about 78 degrees or more. Therefore, the lens module according to the example may easily photograph a wide background or object.

Next, main components configuring the lens module will be described.

The first lens has refractive power. For example, the first lens may have negative refractive power.

The first lens may have a meniscus shape. As an example, the first lens may have a meniscus shape of which a first surface (object-side surface) is convex and a second surface (image-side surface) is concave. As another example, the first lens may have a meniscus shape of which the first surface is concave and the second surface is convex.

The first lens may have an aspherical surface. For example, the first and second surfaces of the first lens may be aspherical. The first lens may be formed of a material having high light transmissivity and excellent workability. For example, the first lens may be formed of plastic or glass, but is not limited to these materials.

The second lens has refractive power. For example, the second lens may have positive refractive power.

Both surfaces of the second lens may be convex. For example, a first surface of the second lens may be convex, and a second surface of the second lens may be convex.

The second lens may have an aspherical surface. For example, the first and second surfaces of the second lens may be aspherical. The second lens may be formed of a material having high light transmissivity and excellent workability. For example, the second lens may be formed of plastic or glass, but is not limited to these materials.

The third lens has refractive power. For example, the third lens may have negative refractive power.

At least one surface of the third lens may be concave. As an example, a first surface of the third lens may be convex and a second surface thereof may be concave. As another example, the first and second surfaces of the third lens may be concave.

The third lens may have an aspherical surface. For example, the first and second surfaces of the third lens may be aspherical. The third lens may be formed of a material having high light transmissivity and excellent workability. For example, the third lens may be formed of plastic or glass, but is not limited to these materials.

The third lens may be formed of a material having a high refractive index. For example, the third lens may be formed of a material having a refractive index of 1.60 or more (in this case, the third lens may have an Abbe number of 30 or less). The third lens formed of this material may easily refract light even while having a small curvature. Therefore, the first lens formed of this material may be easily manufactured and may be advantageous in lowering a defect rate depending on manufacturing tolerance. In addition, the third lens formed of this material may decrease a distance between lenses, and thus it may be advantageous in miniaturizing the lens module.

The fourth lens has refractive power. For example, the fourth lens may have positive refractive power or negative refractive power.

The fourth lens may have a meniscus shape. As an example, the fourth lens may have a meniscus shape of which a first surface is convex and a second surface is concave. As another example, the fourth lens may have a meniscus shape of which the first surface is concave and the second surface is convex.

The fourth lens may have an aspherical surface. For example, the first and second surfaces of the fourth lens may be aspherical. The fourth lens may be formed of a material having high light transmissivity and excellent workability. For example, the fourth lens may be formed of plastic or glass, but is not limited to these materials.

The fifth lens has refractive power. For example, the fifth lens may have positive refractive power.

The fifth lens may be convex toward an image side. For example, a first surface of the fifth lens may be concave and a second surface thereof may be convex.

The fifth lens may have an aspherical surface. For example, the first and second surfaces of the fifth lens may be aspherical. In addition, the fifth lens may have an aspherical surface shape including an inflection point. For example, one or more inflection points may be formed on an image-side surface of the fifth lens.

The fifth lens may be formed of a material having high light transmissivity and excellent workability. For example, the fifth lens may be formed of plastic or glass, but is not limited to these materials.

The sixth lens has refractive power. For example, the sixth lens may have negative refractive power.

The sixth lens may have a meniscus shape of which an object-side surface is convex. For example, a first surface of the sixth lens may be convex, and a second surface of the sixth lens may be concave.

The sixth lens may have an aspherical surface. For example, the first and second surfaces of the sixth lens may be aspherical. In addition, the sixth lens may have an aspherical surface shape including an inflection point. For example, one or more inflection points may be formed on an object-side surface and an image-side surface of the sixth lens. The first surface of the sixth lens having the inflection point may be convex at the center of an optical axis, may be concave in the vicinity of the optical axis, and may again be convex at an edge thereof. In addition, the second surface of the sixth lens may be concave at the center of an optical axis and become convex at an edge thereof. The sixth lens may be formed of a material having high light transmissivity and high workability. For example, the sixth lens may be formed of plastic or glass, but is not limited to these materials.

The image sensor may, for example, realize high resolution of about 1300 megapixels. For example, a unit size of the pixels configuring the image sensor may be about 1.12 μm or less.

The lens module may have a wide field of view. For example, the optical system of the lens module may have a field of view of about 78 degrees or more. In addition, the lens module may have a relatively short length (TTL). For example, an overall length (distance from the object-side surface of the first lens to the image plane) of the optical system configuring the lens module may be about 5.10 mm or less.

The optical system of the lens module configured as described above may satisfy the following Conditional Expression 1:

$$-10<V1-V2<10. \qquad \text{[Conditional Expression 1]}$$

In Conditional Expression 1, V1 is an Abbe number of the first lens, and V2 is an Abbe number of the second lens.

In addition, the optical system of the lens module may satisfy the following Conditional Expression 2:

$$0.6<f5/f. \qquad \text{[Conditional Expression 2]}$$

In Condition Expression 2, f is an overall focal length of the optical system including the first to sixth lenses, and f5 is a focal length of the fifth lens.

Conditional Expression 2 may be a necessary condition for correcting aberration and realizing high resolution. For example, in a case in which Conditional Expression 2 is not satisfied, refractive power of the fifth lens may be excessively high, and thus an aberration correction effect of the optical system may be insufficient, and it may be difficult to realize high resolution of the optical system. Conversely, in a case in which Conditional Expression 2 is satisfied, it may be easy to correct aberration of the optical system and realize high resolution of the optical system.

A lens module 100 according to a first example will be described with reference to FIG. 1.

The lens module 100 includes an optical system including a first lens 110, a second lens 120, a third lens 130, a fourth lens 140, a fifth lens 150, and a sixth lens 160. In addition, the lens module 100 further includes an infrared cut-off filter 70 and an image sensor 80. Further, the lens module 100 includes a stop ST. For example, the stop ST may be disposed between a subject (object) and the first lens 110, as shown in FIG. 1, or between the first lens 110 and the second lens 120.

In this example, the first lens 110 has negative refractive power, and an object-side surface thereof is concave and an image-side surface thereof is convex. The second lens 120 has positive refractive power, and an object-side surface thereof is convex and an image-side surface thereof is convex. The third lens 130 has negative refractive power, and an object-side surface thereof is convex and an image-side surface thereof is concave. The fourth lens 140 has negative refractive power, and an object-side surface thereof is convex and an image-side surface thereof is concave. The fifth lens 150 has positive refractive power, and an object-side surface thereof is concave and an image-side surface thereof is convex. The sixth lens 160 has negative refractive power, and an object-side surface thereof is convex and an image-side surface thereof is concave. In addition, one or more inflection points are formed on each of the object-side surface and the image-side surface of the sixth lens 160.

In the example of FIG. 1, the first lens 110, the third lens 130, the fourth lens 140, and the sixth lens 160 each have negative refractive power, as described above. Among these lenses, the first lens 110 may have the strongest refractive power, and the sixth lens 160 may have the weakest refractive power.

In the example of FIG. 1, a value of V1−V2 from Conditional Expression 1 is 0, and a value of f5/f from Conditional Expression 2 is 0.620.

Figure 2:
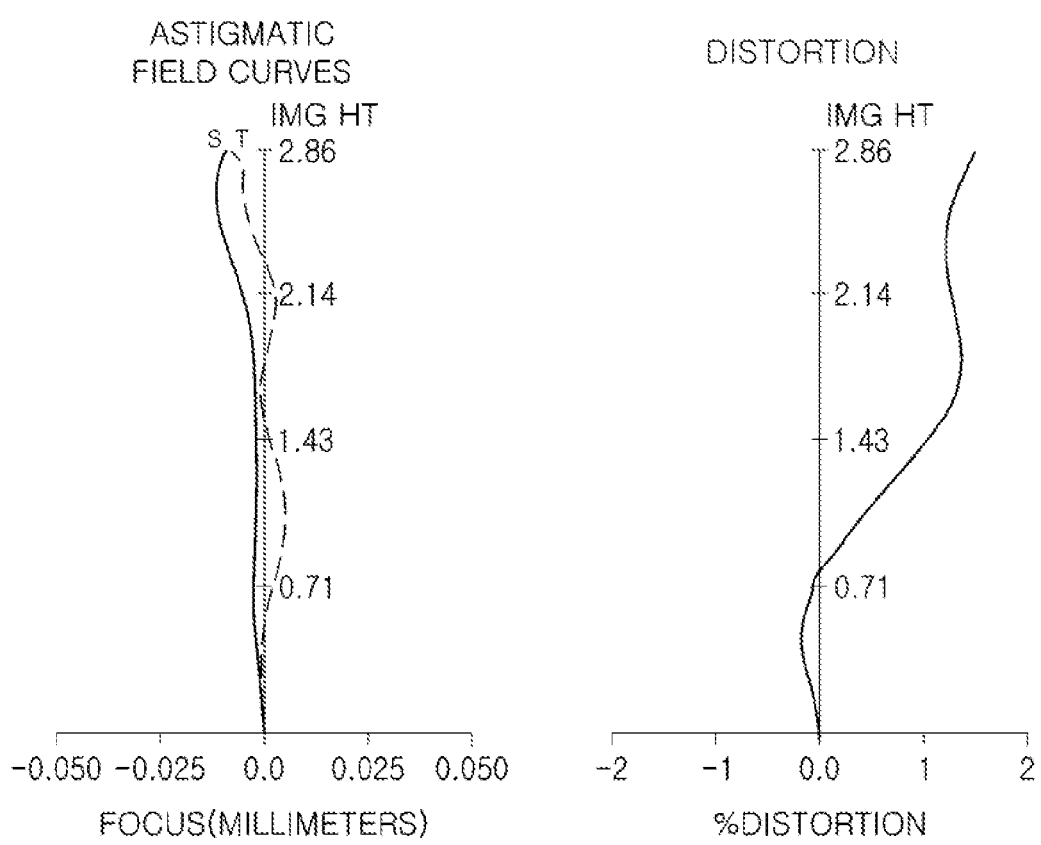
FIGS. 2A and 2B are graphs having curves which represent aberration characteristics of the lens module illustrated in FIG. 1.

FIGS. 2A and 2B are graphs having curves which represent aberration characteristics of the lens module 100.

FIG. 3 is a table representing characteristics of the lenses 110, 120, 130, 140, 150 and 160 configuring the lens module. In FIG. 3, Surface Nos. 1 and 2 indicate the first surface (object-side surface) and the second surface (image-side surface), respectively, of the first lens 110, and Surface Nos. 3 and 4 indicate the first and second surfaces, respectively, of the second lens 120. Similarly, Surface Nos. 5 to 12 indicate first and second surfaces of the third to sixth lenses 130 to 160, respectively. In addition, Surface Nos. 13 and 14 indicate first and second surfaces, respectively, of the infrared cut-off filter 70.

FIG. 4 is a table representing conic constants and aspheric coefficients of the lenses 110, 120, 130, 140, 150 and 160 configuring the lens module 100. In FIG. 4, numbers 1 to 12 in the first column of the table indicate Surface Nos. of the first to sixth lenses 110 to 160.

A lens module 200 according to a second example will be described with reference to FIG. 5.

The lens module 200 includes an optical system including a first lens 210, a second lens 220, a third lens 230, a fourth lens 240, a fifth lens 250, and a sixth lens 260. In addition, the lens module 200 includes an infrared cut-off filter 70, an image sensor 80 and a stop ST. For example, the stop ST may be disposed between an object and the first lens 210, as shown in FIG. 5, or between the first lens 210 and the second lens 220.

In this example, the first lens 210 has negative refractive power, and an object-side surface thereof is concave and an image-side surface thereof is convex. The second lens 220 has positive refractive power, and an object-side surface thereof is convex and an image-side surface thereof is convex. The third lens 230 has negative refractive power, and an object-side surface thereof is concave and an image-side surface thereof is concave. The fourth lens 240 has negative refractive power, and an object-side surface thereof is concave and an image-side surface thereof is convex. The fifth lens 250 has positive refractive power, and an object-side surface thereof is concave and an image-side surface thereof is convex. The sixth lens 260 has negative refractive power, and an object-side surface thereof is convex and an image-side surface thereof is concave. In addition, one or more inflection points are formed on each of the object-side surface and the image-side surface of the sixth lens 260.

Figure 5:
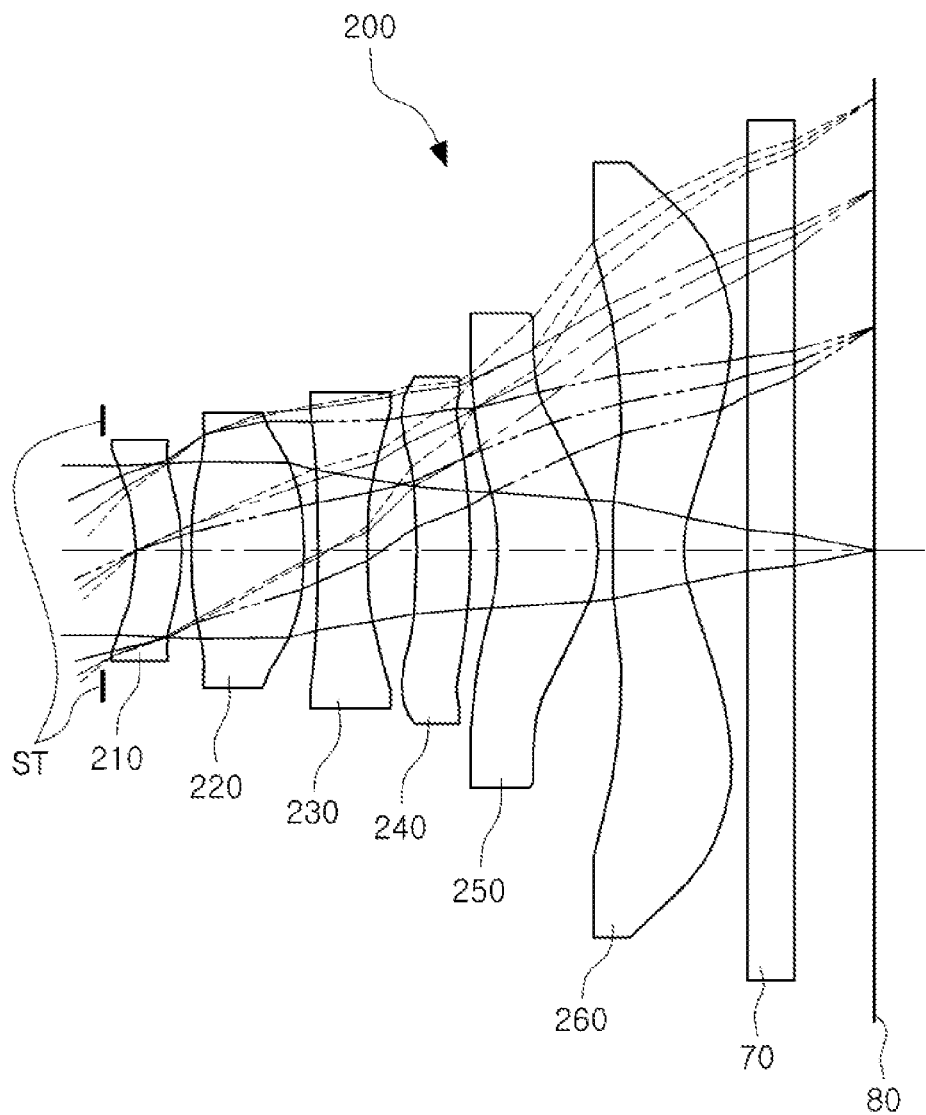
FIG. 5 is a view of a lens module according to another example.

In the example of FIG. 5, first lens 210, the third lens 230, the fourth lens 240, and the sixth lens 260 each have negative refractive power, as described above. Among these lenses, the first lens 210 may have the strongest refractive power, and the sixth lens 260 may have the weakest refractive power.

In the example of FIG. 5, a value of V1–V2 from Conditional Expression 1 is 0, and a value of f5/f from Conditional Expression 2 is 0.721.

Figure 6:
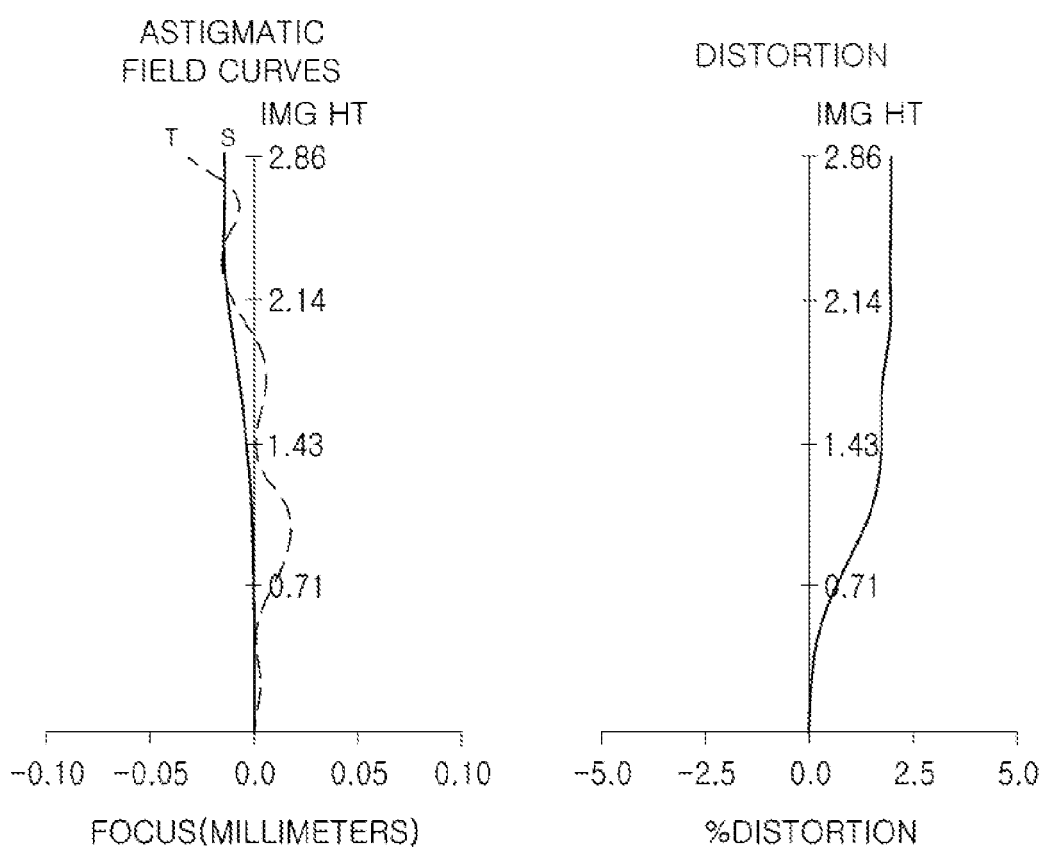
FIGS. 6A and 6B are graphs having curves which represent aberration characteristics of the lens module illustrated in FIG. 5.

FIGS. 6A and 6B are graphs having curves which represent aberration characteristics of the lens module 200.

FIG. 7 is a table representing characteristics of the lenses 210, 220, 230, 240, 250 and 260 configuring the lens module 200. In FIG. 7, Surface Nos. 1 and 2 indicate the first surface (object-side surface) and the second surface (image-side surface), respectively, of the first lens 210, and Surface Nos. 3 and 4 indicate the first and second surfaces, respectively, of the second lens 220. Similarly, Surface Nos. 5 to 12 indicate first and second surfaces of the third to sixth lenses 230 to 260, respectively. In addition, Surface Nos. 13 and 14 indicate first and second surfaces, respectively of the infrared cut-off filter 70.

FIG. 8 is a table representing conic constants and aspheric coefficients of the lenses 210, 220, 230, 240, 250 and 260 configuring the lens module 200. In FIG. 8, numbers 1 to 12 in the first column of the table indicate Surface Nos. of the first to sixth lenses 210 to 260.

A lens module 300 according to another example will be described with reference to FIG. 9.

The lens module 300 includes an optical system including a first lens 310, a second lens 320, a third lens 330, a fourth lens 340, a fifth lens 350, and a sixth lens 360. In addition, the lens module 300 further includes an infrared cut-off filter 70, an image sensor 80 and a stop ST. For example, the stop ST may be disposed between an object and the first lens 310, as shown in FIG. 9, or between the first lens 310 and the second lens 320.

In this example, the first lens 310 has negative refractive power, and an object-side surface thereof is convex and an image-side surface thereof is concave. The second lens 320 has positive refractive power, and an object-side surface thereof is convex and an image-side surface thereof is convex. The third lens 330 has negative refractive power, and an object-side surface thereof is convex and an image-side surface thereof is concave. The fourth lens 340 has positive refractive power, and an object-side surface thereof is convex and an image-side surface thereof is concave. The fifth lens 350 has positive refractive power, and an object-side surface thereof is concave and an image-side surface thereof is convex. The sixth lens 360 has negative refractive power, and an object-side surface thereof is convex and an image-side surface thereof is concave. In addition, one or more inflection points are formed on each of the object-side surface and the image-side surface of the sixth lens 360.

Figure 9:
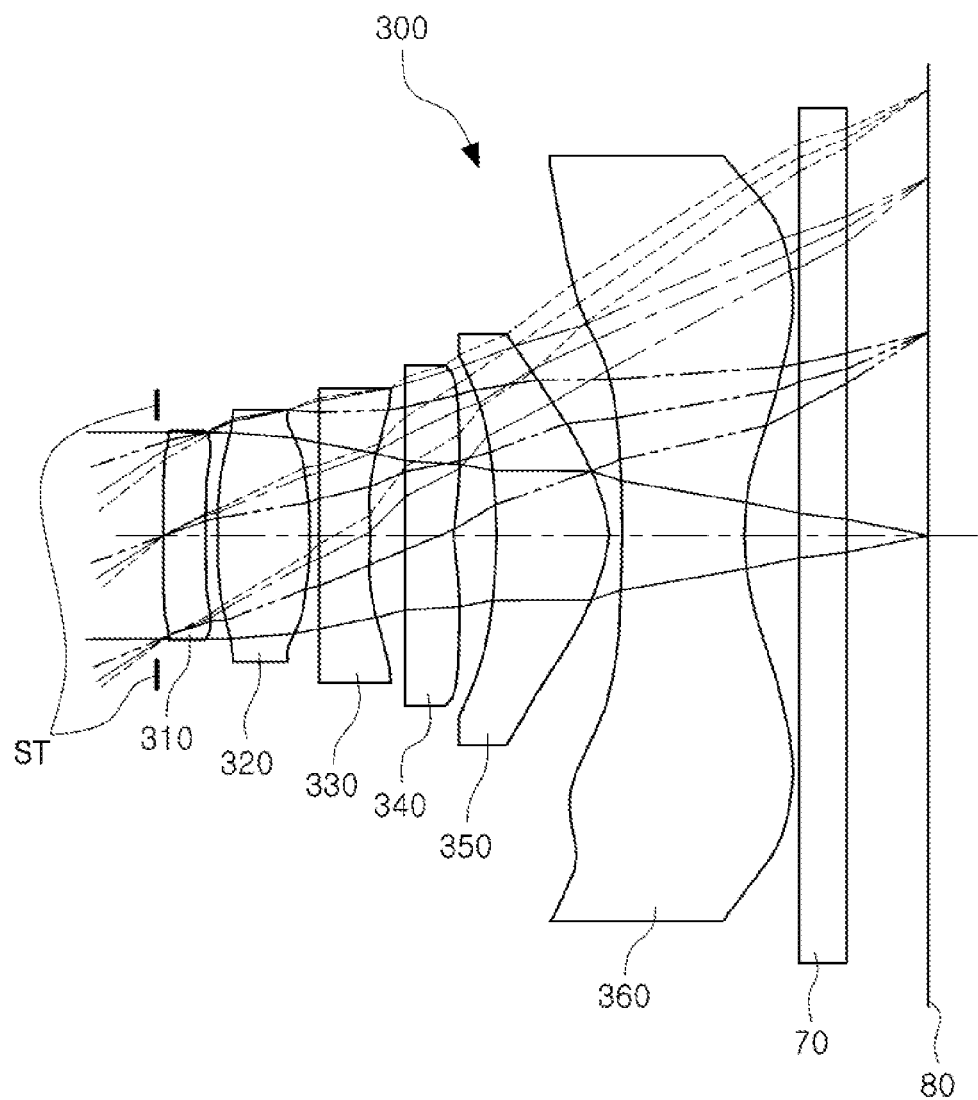
FIG. 9 is a view of a lens module according to another example.

In the example of FIG. 9, the first lens 310, the third lens 330, the fourth lens 340, and the sixth lens 360 each have negative refractive power, as described above. Among these lenses, the first lens 310 may have the strongest refractive power, and the sixth lens 360 may have the weakest refractive power.

In the example of FIG. 9, a value of V1–V2 from Conditional Expression 1 is 0, and a value of f5/f from Conditional Expression 2 is 0.625.

Figure 10A:
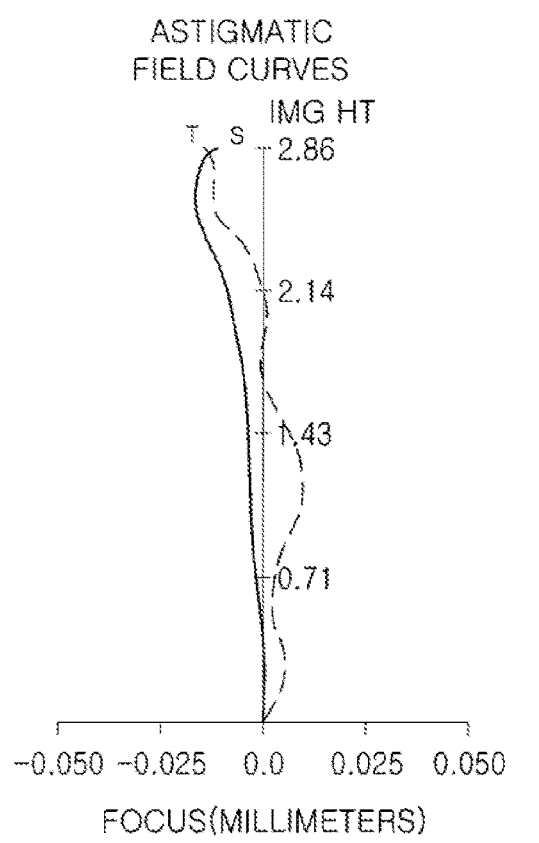
FIGS. 10A and 10B are graphs having curves which represent aberration characteristics of the lens module illustrated in FIG. 9.
Figure 10B:
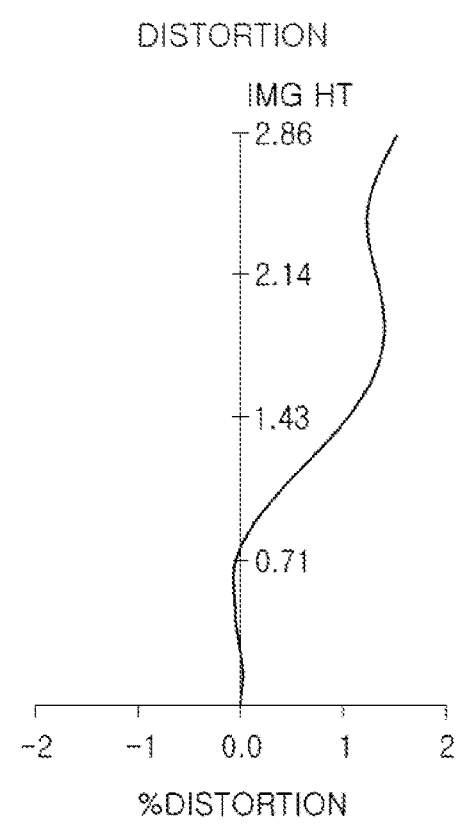

FIGS. 10A and 10B are graphs having curves which represent aberration characteristics of the lens module 300.

FIG. 11 is a table representing characteristics of the lenses 310, 320, 330, 340, 350, 360 configuring the lens module 300. In FIG. 11, Surface Nos. 1 and 2 indicate the first surface (object-side surface) and the second surface (image-side surface) of the first lens 310, and Surface Nos. 3 and 4 indicate the first and second surfaces, respectively, of the second lens 320. Similarly, Surface Nos. 5 to 12 indicate first and second surfaces of the third to sixth lenses 330 to 360, respectively. In addition, Surface Nos. 13 and 14 indicate first and second surfaces, respectively, of the infrared cut-off filter 70.

FIG. 12 is a table representing conic constants and aspheric coefficients of the lenses 310, 320, 330, 340, 350, 360 configuring the lens module 300. In FIG. 12, numbers 1 to 12 in the first column of the table indicate Surface Nos. of the first to sixth lenses 310 to 360.

A lens module 400 according to a fourth example will be described with reference to FIG. 13.

The lens module 400 includes an optical system including a first lens 410, a second lens 420, a third lens 430, a fourth lens 440, a fifth lens 450, and a sixth lens 460. In addition, the lens module 400 further includes an infrared cut-off filter 70, an image sensor 80 and a stop ST. For example, the stop ST may be disposed between an object and the first lens 410, as shown in FIG. 13, or between the first lens 410 and the second lens 420.

In this example, the first lens 410 has negative refractive power, and an object-side surface thereof is convex and an image-side surface thereof is concave. The second lens 420 has positive refractive power, and an object-side surface thereof is convex and an image-side surface thereof is convex. The third lens 430 has negative refractive power, and an object-side surface thereof is concave and an image-side surface thereof is concave. The fourth lens 440 has positive refractive power, and an object-side surface thereof is convex and an image-side surface thereof is concave. The fifth lens 450 has positive refractive power, and an object-side surface thereof is concave and an image-side surface thereof is convex. The sixth lens 460 has negative refractive power, and an object-side surface thereof is convex and an image-side surface thereof is concave. In addition, one or more inflection points are formed on each of the object-side surface and the image-side surface of the sixth lens 460.

In this example, the first lens 410, the third lens 430, the fourth lens 440, and the sixth lens 460 each have negative refractive power, as described above. Among these lenses, the first lens 410 may have the strongest refractive power, and the sixth lens 460 may have the weakest refractive power.

Figure 13:
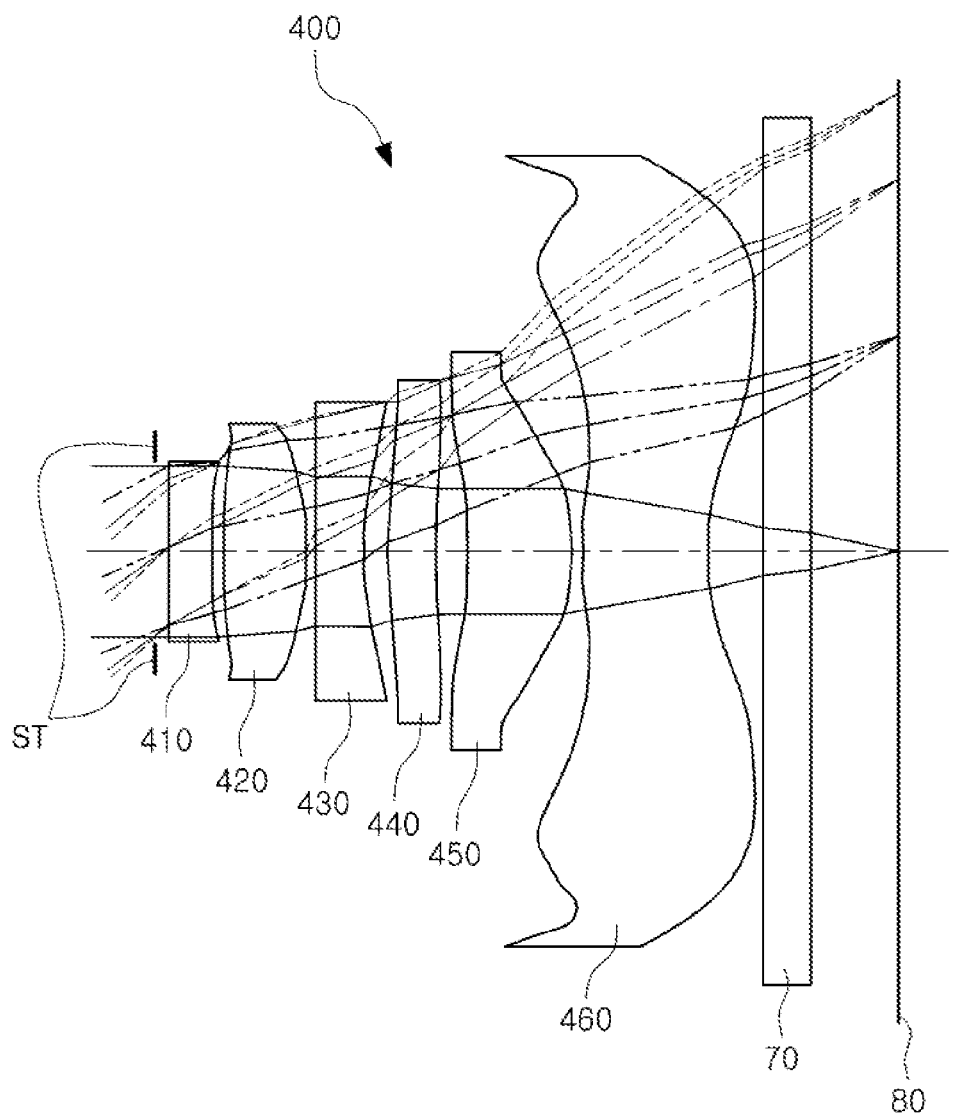
FIG. 13 is a view of a lens module according to yet another example.

In the example of FIG. 13, a value of V1−V2 from Conditional Expression 1 is 0, and a value of f5/$f$ from Conditional Expression 2 is 0.7310.

Figures 14A, 14B:
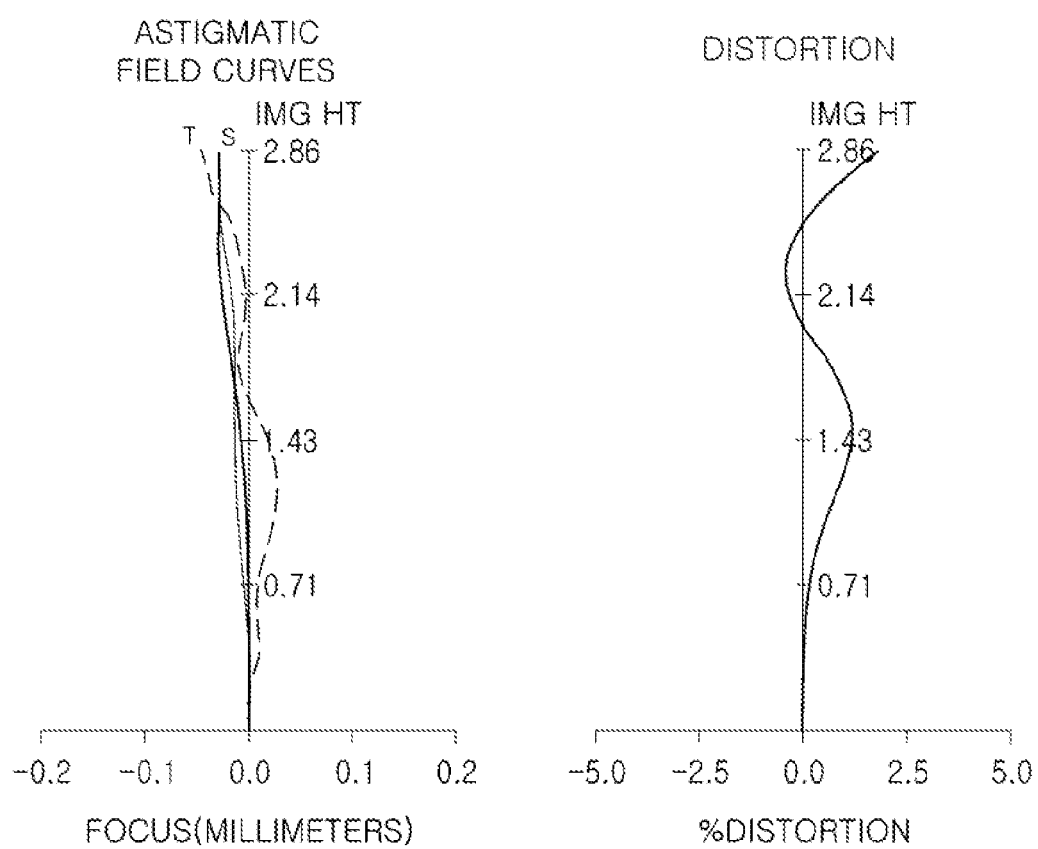
FIGS. 14A and 14B are graphs having curves which represent aberration characteristics of the lens module illustrated in FIG. 13.

FIGS. 14A and 14B are graphs having curves which represent aberration characteristics of the lens module.

FIG. 15 is a table representing characteristics of the lenses 410, 420, 430, 440, 450 and 460 configuring the lens module 400. In FIG. 15, Surface Nos. 1 and 2 indicate the first surface (object-side surface) and the second surface (image-side surface) of the first lens 410, and Surface Nos. 3 and 4 indicate the first and second surfaces, respectively, of the second lens 420. Similarly, Surface Nos. 5 to 12 indicate first and second surfaces of the third to sixth lenses 430 to 460, respectively. In addition, Surface Nos. 13 and 14 indicate first and second surfaces, respectively, of the infrared cut-off filter 70.

FIG. 16 is a table representing conic constants and aspheric coefficients of the lenses 410 to 460 configuring the lens module 400. In FIG. 16, numbers 1 to 12 in the first column of the table indicate Surface Nos. of the first to sixth lenses 410 to 460.

TABLE 1

| Remark | Lens Module 100 | Lens Module 200 | Lens Module 300 | Lens Module 400 |
|---|---|---|---|---|
| f (EFL) | 3.4870 | 2.8390 | 3.4510 | 2.9860 |
| f1 | −102.18 | −17.90 | −200.00 | −200.00 |
| f2 | 2.3540 | 1.6960 | 2.5010 | 2.2680 |
| f3 | −3.9030 | −2.9500 | −4.0470 | −3.1190 |
| f4 | −240.778 | −162.123 | 27.043 | 17.429 |
| f5 | 2.1630 | 2.0460 | 2.1580 | 2.1830 |
| f6 | −2.0470 | −2.1810 | −1.9820 | −2.3980 |
| TTL | 5.0727 | 4.5950 | 4.9275 | 4.6015 |
| FOV | 78.716 | 90.422 | 79.300 | 87.531 |

Table 1 above represents optical characteristics of the lens modules 100-400 according to the examples disclosed herein. The lens module may have an overall focal length (f) of about 2.70 to about 3.60. A focal length (f1) of the first lens may be determined to be in a range of about −210 to about −16.0. A focal length (f2) of the second lens may be determined to be in a range of about 1.50 to about 2.70. A focal length (f3) of the third lens may be determined to be in a range of about −5.0 to about −2.0. A focal length (f4) of the fourth lens may be determined to be in a range of about −250 to about 30.0. A focal length (f5) of the fifth lens may be determined to be in a range of about 1.80 to about 2.40. A focal length (f6) of the sixth lens may be determined to be in a range of about −3.0 to about −1.50. An overall length of the optical system may be determined to be in a range of about 4.40 to about 5.20. A field of view (FOV) of the lens module may be in a range of about 77.0 to about 93.0.

As set forth above, according to the disclosed examples, the optical system may have high resolution.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module, comprising:
   a first lens comprising a negative refractive power and a concave object-side surface;
   a second lens comprising a positive refractive power;
   a third lens comprising a negative refractive power;
   a fourth lens comprising a negative refractive power and a concave image-side surface;
   a fifth lens comprising a concave object-side surface in a paraxial region; and
   a sixth lens comprising one or more inflection points on an image-side surface thereof,
   wherein the first to sixth lenses are sequentially disposed from an object side of the lens module to an image side of the lens module, and
   the lens module has an overall focal length of about 2.70 mm to about 3.60 mm.

2. The lens module of claim 1, wherein the first lens has a meniscus shape.

3. The lens module of claim 1, wherein an object-side surface of the second lens is convex.

4. The lens module of claim 1, wherein an image-side surface of the second lens is convex.

5. The lens module of claim 1, wherein at least one of an object-side surface and an image-side surface of the third lens is concave.

6. The lens module of claim 1, wherein the fourth lens has a meniscus shape.

7. The lens module of claim 1, wherein an image-side surface of the fifth lens is convex.

8. The lens module of claim 1, wherein an object-side surface of the sixth lens is convex.

9. The lens module of claim 1, wherein the image-side surface of the sixth lens is concave.

10. The lens module of claim 1, wherein the refractive power of the first lens is stronger than a refractive power of the sixth lens.

11. A lens module, comprising:
a first lens comprising a negative refractive power and a concave object-side surface;
a second lens comprising a positive refractive power;
a third lens comprising a concave image-side surface;
a fourth lens comprising a refractive power and a concave image-side surface;
a fifth lens comprising a positive refractive power, and a concave object-side surface in a paraxial region; and
a sixth lens comprising a negative refractive power, one or more inflection points on an image-side surface thereof, and a convex object-side surface,
wherein the first to sixth lenses are sequentially disposed from an object side of the lens module to an image side of lens module, and
the lens module has an overall focal length of about 2.70 mm to about 3.60 mm.

12. The lens module of claim 11, wherein the first lens has a meniscus shape.

13. The lens module of claim 11, wherein an image-side surface and an object-side surface of the second lens are convex.

14. The lens module of claim 11, wherein an object-side surface of the third lens is convex.

15. The lens module of claim 11, wherein the fourth lens has a meniscus shape.

16. The lens module of claim 11, wherein an image-side surface of the fifth lens is convex.

17. The lens module of claim 11, wherein the image-side surface of the sixth lens is concave.

18. The lens module of claim 11, wherein the refractive power of the first lens is stronger than the refractive power of the sixth lens.

19. The lens module of claim 11, wherein the fourth lens has a negative refractive power.

* * * * *